(12) United States Patent
Kazama

(10) Patent No.: US 8,041,868 B2
(45) Date of Patent: Oct. 18, 2011

(54) BUS RELAY DEVICE AND BUS CONTROL SYSTEM INCLUDING BUS MASTERS, INTERCONNECT SECTION, AND BRIDGE SECTION

(75) Inventor: Atsushi Kazama, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 12/805,114

(22) Filed: Jul. 13, 2010

(65) Prior Publication Data

US 2010/0281198 A1    Nov. 4, 2010

Related U.S. Application Data

(63) Continuation of application No. 11/984,607, filed on Nov. 20, 2007, now Pat. No. 7,783,804.

(30) Foreign Application Priority Data

Nov. 22, 2006  (JP) .................................. 2006-315166

(51) Int. Cl.
*G06F 13/00* (2006.01)

(52) U.S. Cl. ..................... 710/110; 710/309; 710/316

(58) Field of Classification Search .......... 710/104–105, 710/110–119, 306–317, 58–61
See application file for complete search history.

(56) References Cited

U.S. PATENT DOCUMENTS

| 6,425,041 | B1 | 7/2002 | Klein |
| 7,380,045 | B2 | 5/2008 | Park et al. |
| 7,581,049 | B2 | 8/2009 | Tanabe |
| 7,783,804 | B2 * | 8/2010 | Kazama ........................ 710/110 |
| 2006/0080489 | A1 | 4/2006 | Hiji |

FOREIGN PATENT DOCUMENTS

| JP | 2005-244979 (A) | 9/2005 |
| JP | 2006-065457 (A) | 3/2006 |
| JP | 2006-127022 (A) | 5/2006 |

OTHER PUBLICATIONS

"AMBATM specification, Rev2. 1999. pp. 18-19".
Japanese Office Action dated Jul. 12, 2011, with English translation.

\* cited by examiner

*Primary Examiner* — Raymond Phan
(74) *Attorney, Agent, or Firm* — McGinn Intellectual Property Law Group, PLLC

(57) ABSTRACT

A combination includes a first bus master coupled to a first bus to output a first signal group including at least one of signals onto the first bus, a second bus master coupled to the first bus to output a second signal group including at least one of signals onto the first bus, an interconnect section coupled between the first bus and a second bus to receive the first and second signal groups and to output a third signal group including at least one of signals onto the second bus, and a bridge section coupled between the second bus and a third bus to receive the third signal group and to output a fourth signal group including at least one of signals onto the third bus free from performing a selecting operation for the third signal group.

7 Claims, 7 Drawing Sheets

FIG. 4

| | | FIRST CONTROL SIGNAL GROUPS | SECOND CONTROL SIGNAL GROUPS | THIRD CONTROL SIGNAL GROUPS |
|---|---|---|---|---|
| BUS RELAY DEVICE OF THIS INVENTION (FIG.1) | NUMBER OF SIGNAL GROUPS | 4 | 1 | 1 |
| | BUS SPECIFICATION | HIGH SPEED BUS SPECIFICATION | RELAY BUS SPECIFICATION | LOW SPEED BUS SPECIFICATION |
| CONVENTIONAL BUS RELAY DEVICE (FIG.5) | NUMBER OF SIGNAL GROUPS | 4 | 2 | 1 |
| | BUS SPECIFICATION | HIGH SPEED BUS SPECIFICATION | HIGH SPEED BUS SPECIFICATION | LOW SPEED BUS SPECIFICATION |

FIG. 6 (Related Art)

- SIGNAL GROUP OF HIGH SPEED BUS SPECIFICATION read address [31:0]

read LENGTH OF BURST [3:0]

read TRANSMISSION SIZE [2:0]

read BURST TYPE [1:0]

read EXCLUSIVE ACCESS [1:0]

read ATTRIBUTES OF Cache/Buffer/secure [3:0]

read HANDSHAKE SIGNAL Master→Slave read HANDSHAKE SIGNAL Slave→Master write address [31:0]

write LENGTH OF BURST [3:0]

write TRANSMISSION SIZE [2:0]

write BURST TYPE [1:0]

write EXCLUSIVE ACCESS [1:0]

write ATTRIBUTES OF Cache/Buffer/secure [3:0]

write HANDSHAKE SIGNAL Master→Slave write HANDSHAKE SIGNAL Slave→Master

- SIGNAL GROUP OF LOW SPEED BUS SPECIFICATION

ADDRESS [15:0]

write enable byte enable [1:0]

wait REQUEST SIGNAL

BUS RELAY DEVICE AND BUS CONTROL SYSTEM INCLUDING BUS MASTERS, INTERCONNECT SECTION, AND BRIDGE SECTION

The present application is a Continuation Application of U.S. patent application Ser. No. 11/984,607, filed on Nov. 20, 2007, now U.S. Pat. No. 7,783,804, which is based on Japanese patent application No. 2006-315166, filed on Nov. 22, 2006, the entire contents of which is incorporated herein by reference.

BACKGROUND OF THE INVENTION

1. Field of the Invention

The present invention relates to a bus relay device that relays buses of different specifications. More particularly, this invention relates to a bus relay device in which a plurality of requests inputted from a first bus are arbitrated, converted into signals, and outputted to a second bus. This invention also relates to a bus control system which includes the bus relay device.

2. Description of Related Art

Conventionally, there has been used a bus control system for arbitrating the use of a bus to which a plurality of devices are connected, for example, as described in "AMBATM specification, Rev2, 1999, pp. 18-19". A device which requests for the use of the bus and uses the bus is called a master, and a device which the master accesses through the bus is called a slave.

Lately, bus control systems become more complicated than before because information processing devices and electronic devices having such bus control systems have been more advanced in terms of the high performance and functions. Accordingly, the number of masters connected to a bus tends to increase. When the device making a request and the device receiving the request differ in bus specification, the bus specification has to be converted to be usable.

In particular, when a master connected to a high-speed access bus makes an access to a slave connected to a low speed access bus, the format of a control signal group must be changed according to the bus specification acceptable to the slave. For example, when the master outputs read and write control signal groups in parallel while the slave sequentially receives the control signal groups one by one, it must be determined which one of the read and write control signal groups is prioritized. Moreover, when a plurality of masters are connected to a bus, the priority order of all the control signal groups transmitted from the plurality of masters must be determined.

FIG. 5 shows an example of a conventional bus control system. As shown in FIG. 5, a bus control system 9 includes masters 10a and 10b, a slave 20, and a bus relay device 80. The bus relay device includes an interconnect section 810 and a bridge section 820. In addition, in the bus control system 9 in FIG. 5, a device on the master side is connected to a high speed access bus 40 and a device on the slave side is connected to a low speed access bus 60. In the example shown in FIG. 5, two masters are connected to the bus relay device 80. Here, signals 41a and 41b and signals 42a and 42b, which are outputted from the masters 10a and 10b, respectively, are control signal groups each containing a plurality of signals. For example, the signal group 41a, which is one of the control signals groups, contains information on an address for a reading operation, the burst length during a burst transmission, and the like. The signal group 42a which is outputted from the master 10a contains information on an address for a writing operation, the burst length during the burst transmission, and the like. The signal group 41b which is outputted from the master 10b is the same as the signal group 41a and the signal group 42b which is outputted from the master 10b is the same as the signal group 42a which is outputted from the master 10a. Note that, a flow of data to be read or written is omitted in FIG. 5. Here, FIG. 6 shows specific examples of read and write control signal groups in high speed and low speed buses. The control signal groups outputted from masters 10a and 10b conform to the high speed bus specification and the control signal group received by the slave 20 conforms to the low speed bus specification.

The masters 10a and 10b support the high speed bus specification and are capable of outputting read and write control signal groups in parallel. The slave 20 supports the low speed bus specification and is not capable of processing, in parallel, the read and write control signal groups outputted from the masters 10a and 10b.

The bus relay device 80 provides a relay connection between the high speed access bus 40 and the low speed access bus 60. The interconnect section 810 includes a routing function and an arbitration function. Specifically, according to the priority order of masters, the interconnect section 810 selects one of read control signal groups and one of write control signal groups outputted from the plurality of masters 10a and 10b. The interconnect section 810 then outputs the selected control signal groups to the bridge section 820. The bridge section 820 selects any one of the read and write control signal groups inputted from the interconnect section 810, and performs bus protocol conversion of the bus specification of the selected one control signal group from the bus specification for the high speed access bus into that for the low speed access bus. The bridge section 820 then outputs the control signal group with the converted bus specification to the slave 20. A possible example of a process carried out in the bus protocol conversion between the high speed bus specification and the low speed bus specification shown, for example, in FIG. 6 is to adjust the number of address bits between the high speed bus specification and the low speed bus specification. The bridge section 820 converts the number of address bits of the received control signal group of the high speed bus specification into that of the low speed bus specification, and outputs the resultant control signal group to the slave 20.

FIG. 5 shows a case where the interconnect section 810 includes two arbiters 811 and 812, and where the bridge section 820 including an arbiter 821. The arbiter 811 receives the read control signal groups 41a and 41b respectively outputted from the masters 10a and 10b, and outputs one read control signal group 41x (any one of the read control signal groups 41a and 41b) according to the priority order of masters. The arbiter 812 receives the write control signal groups 42a and 42b respectively outputted from the masters 10a and 10b, and outputs one write control signal group 42x (any one of the write control signal groups 42a and 42b) according to the priority order of masters. In addition, the arbiter 821 receives the read control signal group 41x and the write control signal group 42x, and outputs a reading or write control signal group 61 according to the priority order of the reading and write control signal groups.

As just described, the conventional bus control system 9 requires two steps of arbitration processes for a plurality of requests outputted from the plurality of masters. More specifically, the interconnect section 810 performs the arbitration process according to the priority order of the plurality of masters in the first step, and the bridge section 820 performs the arbitration process according to the priority order of the read and write control signal groups in the second step. Furthermore, the bridge section 820 performs a conversion process for converting the bus specification.

In the conventional bus control system 9, the interconnect section 810 and the bridge section 820 each have the arbitration function. Meanwhile, the interconnect section 810 and the bridge section 820 were designed by different designers. Accordingly, a large number of man-hours are needed not only for designing the bridge section but also for inspecting the bridge section.

SUMMARY

To solve the problem mentioned above, a bus relay device according to the present invention includes: an interconnect section for receiving a first request and a second request conforming to a first bus specification in parallel through a first bus and for outputting each of the first and second requests as a signal; and a bridge section for outputting the signal containing each of the first and second requests as the each of the first and second requests conforming to a second bus specification. Thus, arbitration processes of control signal groups are collectively operated in the interconnect section alone, whereby the number of man-hours for designing the bridge section can be reduced. Furthermore, the circuit size of the bus control system can be reduced.

According to the present invention, the bus arbitration can be made by the interconnect section alone. As a result, the number of man-hours for designing and inspecting the bridge section is reduced.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 4 is a table in which the numbers of control signal groups and bus specifications are compared between a bus relay device according to the present invention shown in FIG. 1 and a conventional bus relay device 80 shown in FIG. 5.

FIG. 6 is a diagram showing examples of a high speed bus specification and a low speed bus specification.

DETAILED DESCRIPTION OF THE PREFERRED EMBODIMENTS

Figure 1:
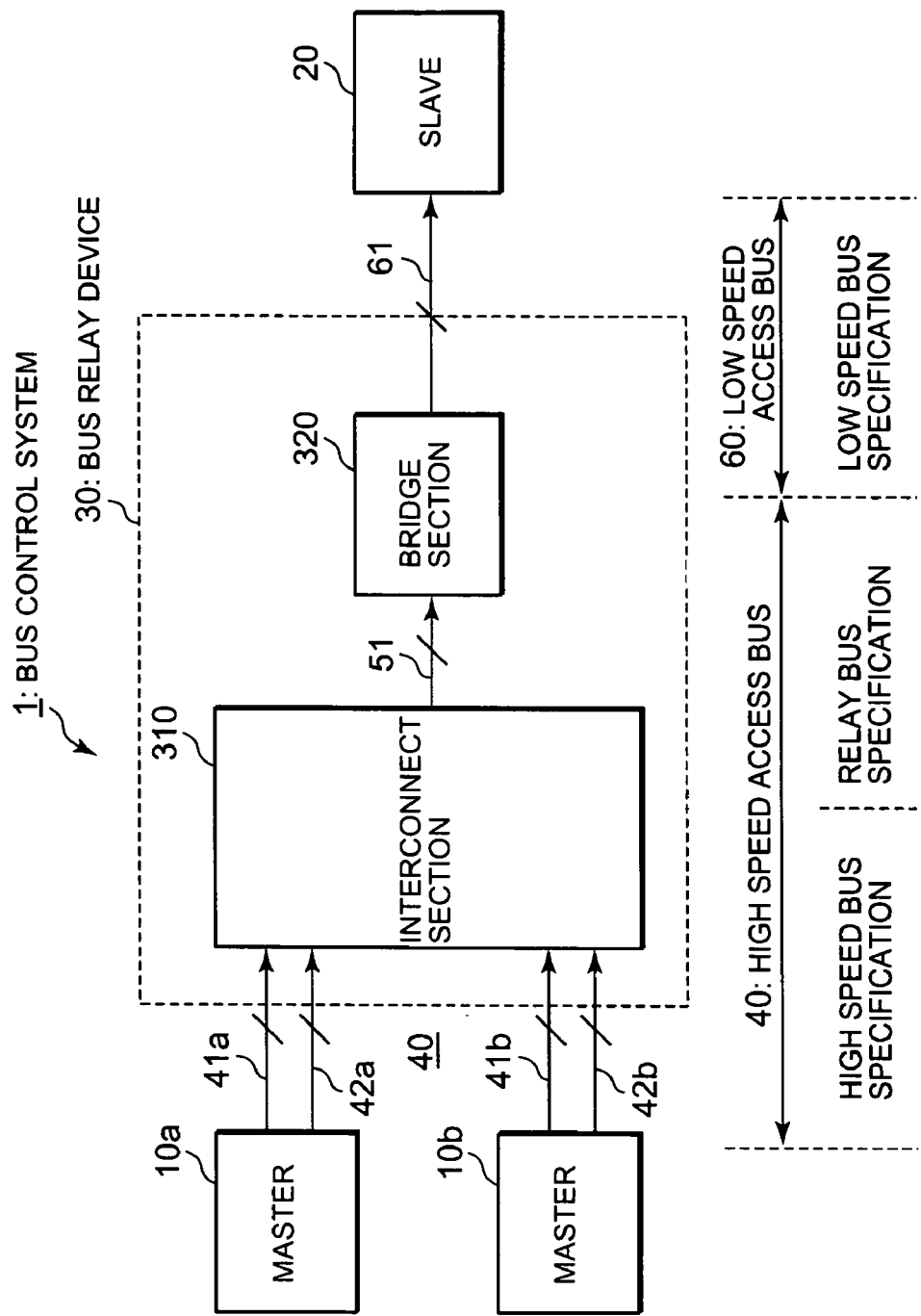
FIG. 1 is a block diagram showing a configuration example of a bus control system according to the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, embodiments of the present invention will be described with reference to the drawings. In the following description of the drawings, the same or similar structures or functions of components will be denoted by the same or similar reference numerals and the explanation will be omitted. In addition, in this specification, when there are a plurality of components of the same kind, alphabet characters are added to the reference numerals of the components to identify the components. Accordingly, each of the components can be identified. Moreover, when components have the same name but different structures or functions, the reference numerals will be shown as "310-1" having "-n" (n is a natural number) added to their original reference numerals, in order to discriminate these components. For example, a component denoted by the reference numeral 310-1 indicates another specific aspect of the component denoted by the reference numeral 310.

First Embodiment

In a first embodiment, described is a case where a fixed priority order of a plurality of control signal groups outputted from a plurality of masters is determined beforehand. In this case, an interconnect section sequentially selects a predetermined number of control signal groups from the plurality of control signal groups according to the fixed priority order. In this embodiment, described are a bus relay device and a bus control system, which include such an interconnect section.

Figure 7:
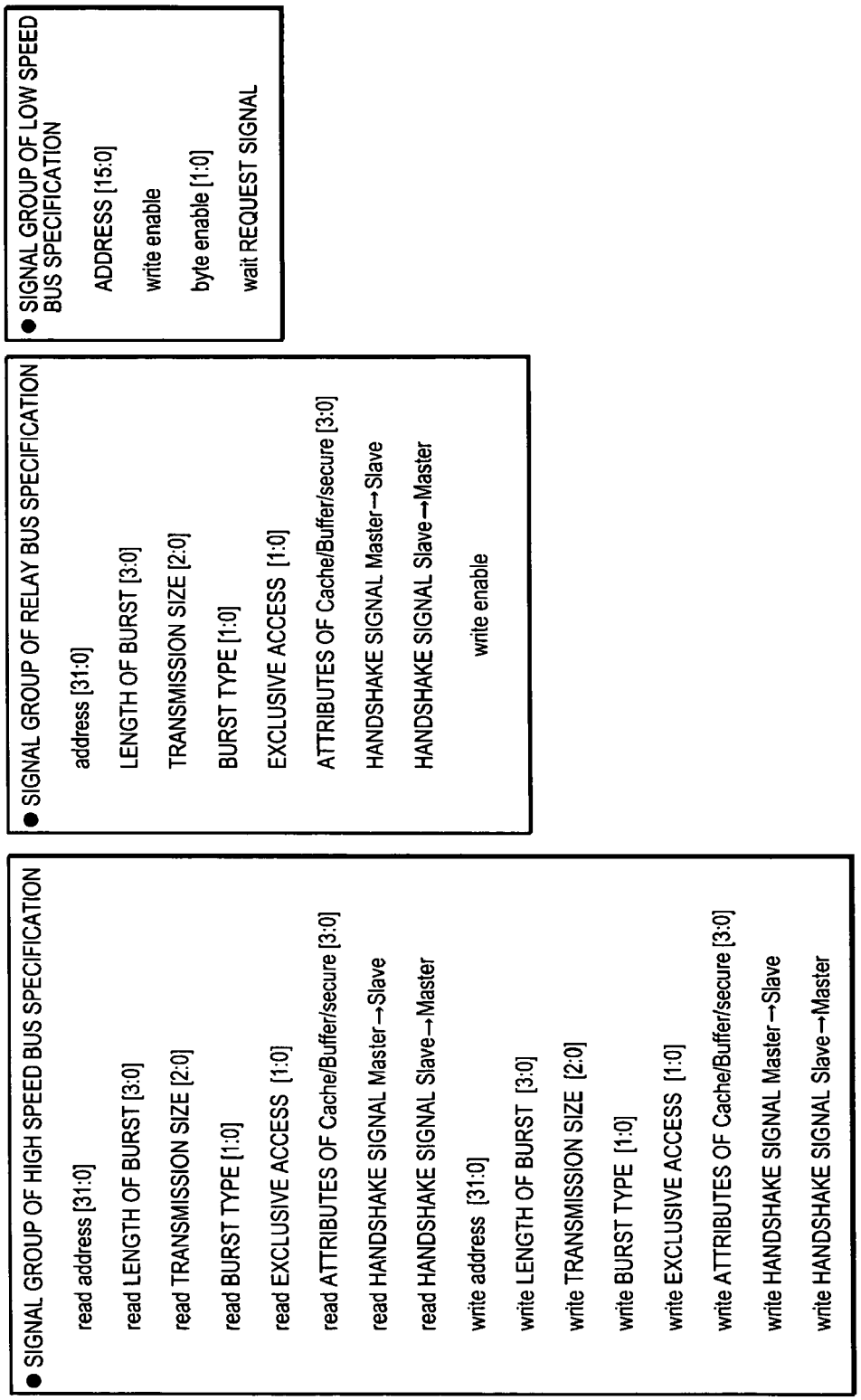
FIG. 7 is a diagram showing examples of the high speed bus specification, a relay bus specification and the low speed bus specification.

FIG. 1 shows a block diagram showing a configuration example of a bus control system according to the present invention. As shown in FIG. 1, the bus control system 1 includes masters 10*a* and 10*b*, a slave 20 and a bus relay device 30. The bus relay device 30 includes an interconnect section 310 and a bridge section 320. Moreover, in the bus relay system 1 shown in FIG. 1, the devices on the master side are connected to a high speed access bus 40 (an example of a first bus) and the device on the slave side is connected to a low speed access bus 60 (an example of a second bus). The master 10*a* is capable of outputting a read control signal group 41*a* and a write control signal group 42*a* in parallel. The master 10*b* is capable of outputting a read control signal group 41*b* and a write control signal group 42*b* in parallel. FIG. 7 shows the read control signal groups and the write control signal groups. The control signal groups outputted from the masters 10*a* and 10*b* conform to a high speed specification and the signal group received by the slave 20 conforms to a low speed specification. A relay bus specification in FIG. 7 will be described later. As is clear from FIG. 7, the read and write control signal groups contain, for example, information on addresses for reading and writing operations. Meanwhile, the bus relay device 30 in FIG. 1 connects the high speed access bus 40 and the low speed access bus 60. Note that, since FIG. 1 is just an example of the bus control system in this embodiment, a larger number of devices may be connected to the bus on the master side (the high speed access bus), and also a larger number of devices may be connected to the bus on the slave side (the low speed access bus). In addition, FIG. 1 schematically shows the buses for handling the control signal groups outputted from the devices on the master side and received by the device on the slave side.

The masters 10*a* and 10*b* output various signals in accordance with the bus specification of the high speed access bus 40 (the high speed bus specification: see FIG. 7).

In contrast, the slave 20 operates in response to the read or write control signal groups outputted from the masters 10*a* and 10*b*. At this time, the slave 20 operates a reading operation and a writing operation in accordance with the bus specification of the low speed access bus 60 (the low speed bus specification: see FIG. 7). Here, assume that the specification of the low speed access bus 60 does not allow the read and write control signal groups to be transmitted in parallel, but only allows the read and write control signal groups to be serially transmitted. Accordingly, each of the read and write control signal groups conforming to the low speed bus specification has a part common to the reading operation and the writing operation, and a part differentiating between the reading request and the writing request. The device on the slave side identifies a transmitted request according to the information of the part differentiating between the reading request and the writing request, and then performs an operation according to the reading request or the writing request.

The bus relay device 30 connects the high speed access bus 40 and the low access bus 60. As described above, the interconnect section 310 includes the routing function and the arbitration function. Specifically, according to the priority order of masters and the priority order of requests, the interconnect section 310 selects one control signal group from the plurality of read or write control signal groups outputted from the plurality of masters. The interconnect section 310 converts the selected control signal group into the control signal group conforming to the bus specification between the interconnect section 310 and the bridge section 320, and outputs the resultant control signal group to the bridge section 320.

Here, the bus specification between the interconnect section 310 and the bridge section 320 is a specification for a bus relaying the high speed bus specification and the low speed bus specification. Hereinafter, the bus specification between the interconnect section 310 and the bridge section 320 is called a "relay bus specification." For the purpose of facilitating the conversion from the high speed bus specification into the low speed bus specification, the relay bus specification is determined on the basis of the number of signal groups which the slave 20 processes, an information format for differentiating between the reading operation and the writing operation, and the like. Consequently, the relay bus specification serves as an intermediate specification between high speed bus specification and low speed bus specification. In this embodiment, the number of the control signal groups of the relay bus specification corresponds to the low speed bus specification. In other words, the interconnect section 310 outputs one control signal group. The read or write control signal group serves as information containing information common to reading and writing, and information (specifically, a write enable signal of one bit) for identifying (differentiating between) reading and writing. The information common to reading and writing is information that can be expressed in a common data format. Such information includes an address, a size, a way to access, and the like.

Any one of the formats conforming to the high speed bus specification and the low speed bus specification may be employed as the data format (a format and an information amount such as the number of bits) of the common information. In this embodiment, the data format is determined as one conforming to the high speed bus specification. For example, an address which is one piece of information in the control signal group for the relay bus specification has the same number of bits as that of the address of the control signal group for the high speed bus specification. In other words, the control signal group for the high speed bus specification includes address information expressed by 32 bits according to the specification shown in FIG. 7, while the control signal group for the relay bus specification also includes the address information expressed by 32 bits. Thus, while the relay bus specification is based on the high speed bus specification, the relay bus specification is designed to serially transmit any one of the read control signal group and the write control signal group. The relay bus specification may be a specification having a part indicating information on these control signal groups in common. In this embodiment, the high speed bus specification is set to transmit the read control signal groups and the write control signal groups in parallel. For this reason, the interconnect section 310 outputs one control signal group by extracting the common information from the read and write control signal groups, by adjusting the data format as needed, and then by adding information differentiating between the reading and the writing. In FIG. 1, the control signal group generated in the relay bus specification is denoted by the reference numeral 51.

The bridge section 320 converts (bus protocol conversion) the control signal group inputted from the interconnect section 310 into a control signal group determined according to the low speed bus specification used in the low speed access bus 60. The bridge section 320 then outputs the resultant control signal group to the slave 20. The bridge section 320 converts the control signal group determined in conformity with the relay bus specification into the format for the low speed bus specification. As an example of the bus protocol conversion, the bridge section 320 converts the number of address bits contained in the control signal group conforming to the relay bus specification into the number of address bits conforming to the low speed bus specification.

In the following description, in order to clearly express the differentiation of the control signal groups determined according to these bus specifications, the control signal groups outputted from the masters 10a and 10b are called first control signal groups (reference numerals 41a, 41b, 42a, 42b), the control signal group outputted from the interconnect section 310 is called a second control signal group (reference numeral 51), and the control signal group outputted from the bridge section 320 is called a third control signal group (reference number 61.) In addition, the priority order of the plurality of masters is called a "master order"; information for determining the master order is called "master order information"; the priority order of reading or writing is called a "control signal group order"; information for determining the control signal group order is called "control signal group order information"; and a combination of the master order information and the control signal group order information is called "priority order information." The above described is the overall description of the bus control system. Next, a specific example of the interconnect section 310 is described.

Figure 2:
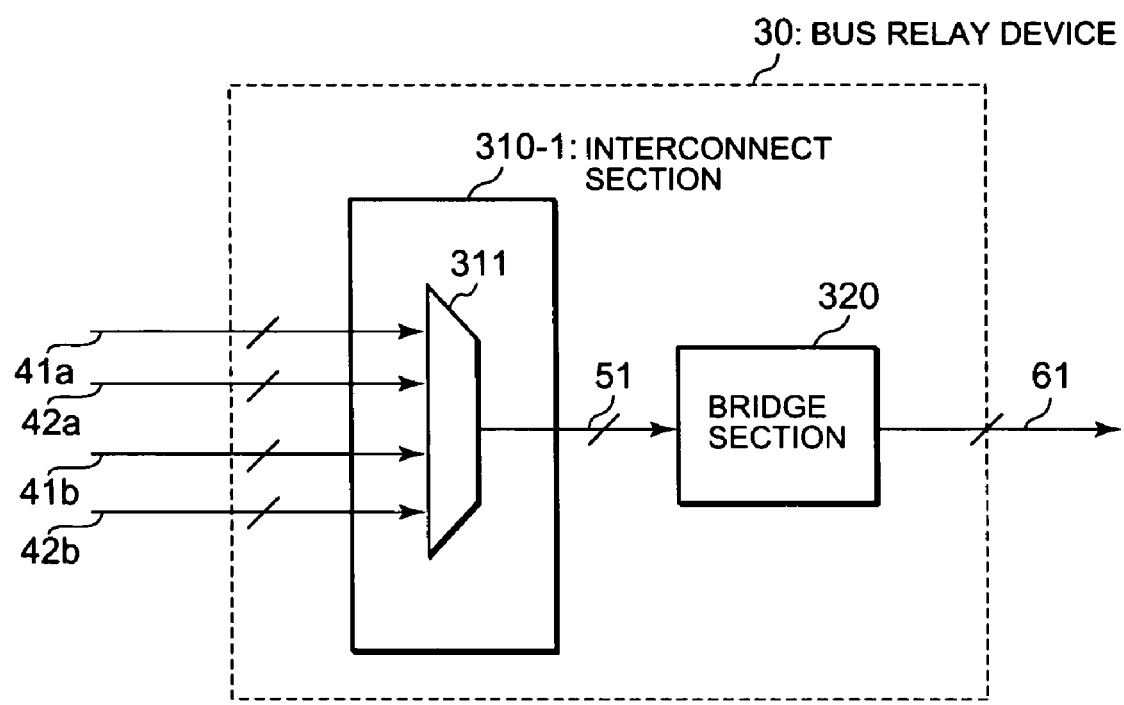
FIG. 2 is a block diagram showing a configuration example of a bus relay device according to a first embodiment.

FIG. 2 is a block diagram showing a configuration example of a bus relay device according to this embodiment. The bus relay system 30 shown in FIG. 2 includes an interconnect section 310-1 and the bridge section 320. FIG. 2 shows an example that the interconnect section 310-1 is implemented by one arbiter 311. The arbiter 311 receives the first control signal groups outputted from the masters 10a and 10b, i.e., the read control signal groups 41a and 41b, and the write control signal groups 42a and 42b. The arbiter 311 sequentially selects any one of the received first control signal groups and converts the selected first control signal group into the second control signal group determined according to the relay bus specification (the read or write control signal group 51 determined according to the relay bus specification). The arbiter 311 then outputs the second control signal group to the bridge 320. The bridge 320 converts the second control signal group inputted from the arbiter 311 into the third control single group (the reading or write control signal group 61 determined according to the low speed bus specification). In short, the bridge section 320 performs the bus protocol conversion.

The arbiter 311 includes a circuit designed in conformity with a predetermined priority order of the control signal groups outputted from the plurality of masters 10a and 10b.

Thus, the plurality of first control signal groups inputted to the arbiter 311 is selected according to the predetermined priority order information. Then, one of the selected first control signal groups is converted into the signal groups for the relay bus specification, and is outputted. For example, when a read control signal group is selected as the first control signal group, the selected read control signal group is converted into information (such as an address) common to the reading and the write control signal groups and into information (a flag) differentiating between reading and writing. The selected control signal group thus becomes the second control signal group. In this case, the information common to the reading and the writing is based on the high speed bus specification. Meanwhile, the information differentiating between the reading and the writing is based on the low speed bus specification.

Figure 5:
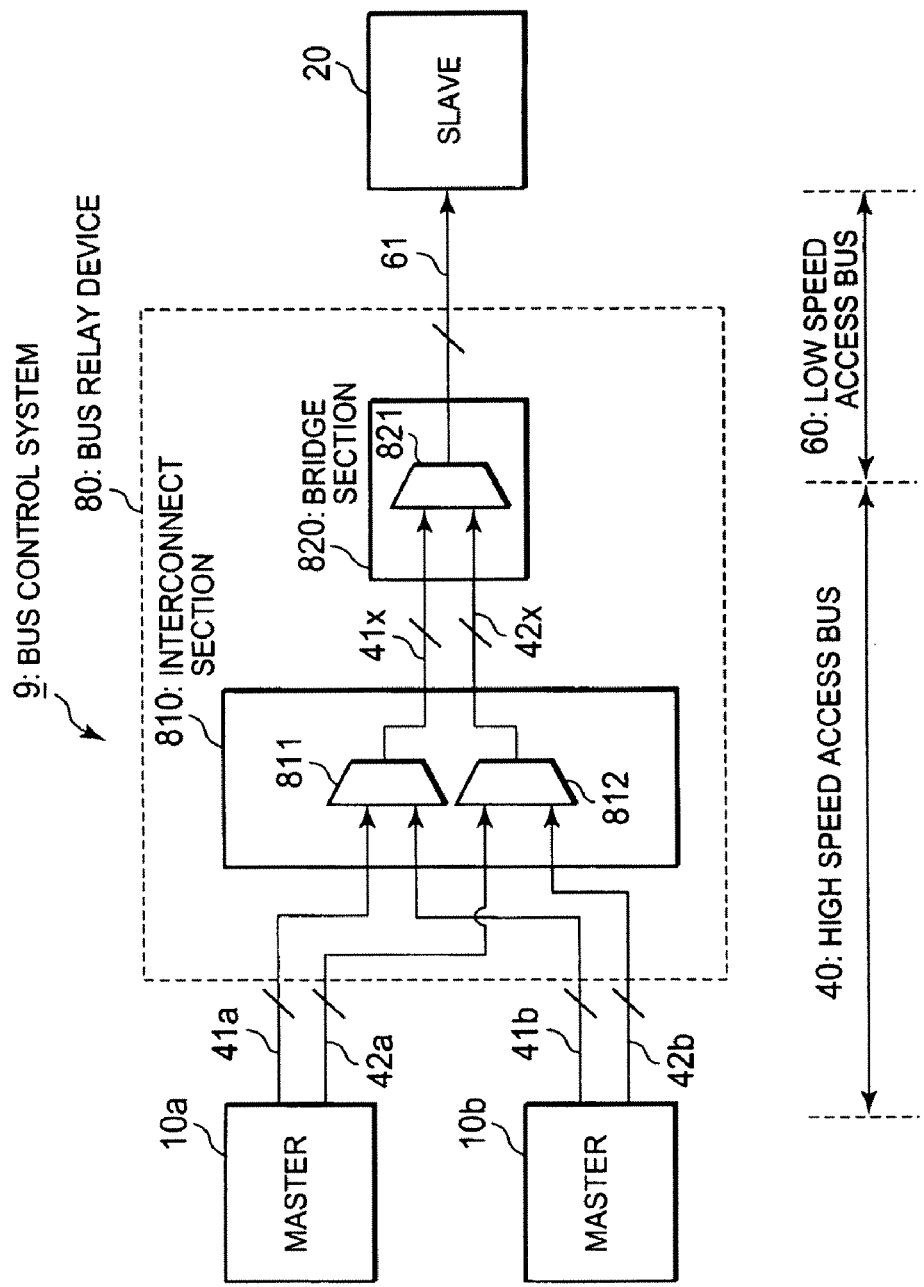
FIG. 5 is a diagram showing an example of a conventional bus control system.

As described above, according to this embodiment, the arbitration function is implemented by the single arbiter 311 unlike the case the arbitration function is implemented by the three arbiters 811, 812 and 821 in the bus relay device 80 as shown in FIG. 5. In other words, the interconnect section alone makes the arbitration between the control signal groups outputted from the masters. All the arbitration processes of the control signal groups are operated in the interconnect section, and this simplifies the designing of the bridge section 320. Accordingly, even if the interconnect section 310 and the bridge section 320 are designed by different designers, the number of man-hours required for designing the bridge section 320 is reduced. In addition, the number of man-hours required for inspecting the bridge section 320 is also reduced. In this embodiment, since the arbitration processes of the control signal groups are collectively operated in the interconnect section 310 alone, reducing the circuit size of the bus control system is possible. This is because this embodiment uses the single arbiter that allows a plurality of inputs and one output in the interconnect section 310, while a conventional bus system uses a larger number of arbiters as shown in FIG. 5. For example, the circuit size is made smaller when the arbiter allowing four inputs and one output is used as shown in FIG. 2, than when the plurality of arbiters allowing two inputs and one output are used as shown in FIG. 5. In addition, the arbiter 311 in FIG. 2 selects and outputs one control signal group, which reduces the number of signal lines connecting the interconnect section 310 and the bridge section 320. For example, according to the high speed bus specification, each master outputs the read control signal group and the write control signal group in parallel, and the reading operation and the writing operation can be performed independently. For this reason, the signal lines showing addresses are individually provided for the reading operations and the writing operations. In the conventional bus control system shown in FIG. 5, the bridge section receives both of the read and write control signal groups, while, in this embodiment, the bridge section 320 only receives any one of the read and write control signal groups. Accordingly, in the bus control system according to this embodiment, the number of address signal lines included in the signals lines between the interconnect section 310 and the bridge section 320 is reduced, compared to that of the conventional bus control system.

Second Embodiment

In a second embodiment, described is a case where an interconnect section stores priority order information. In this case, the interconnect section selects a predetermined number of control signal groups in turn from a plurality of control signal groups according to the priority order information being stored. In this embodiment, described are a bus relay device and a bus control system including such an interconnect section.

Figure 3:
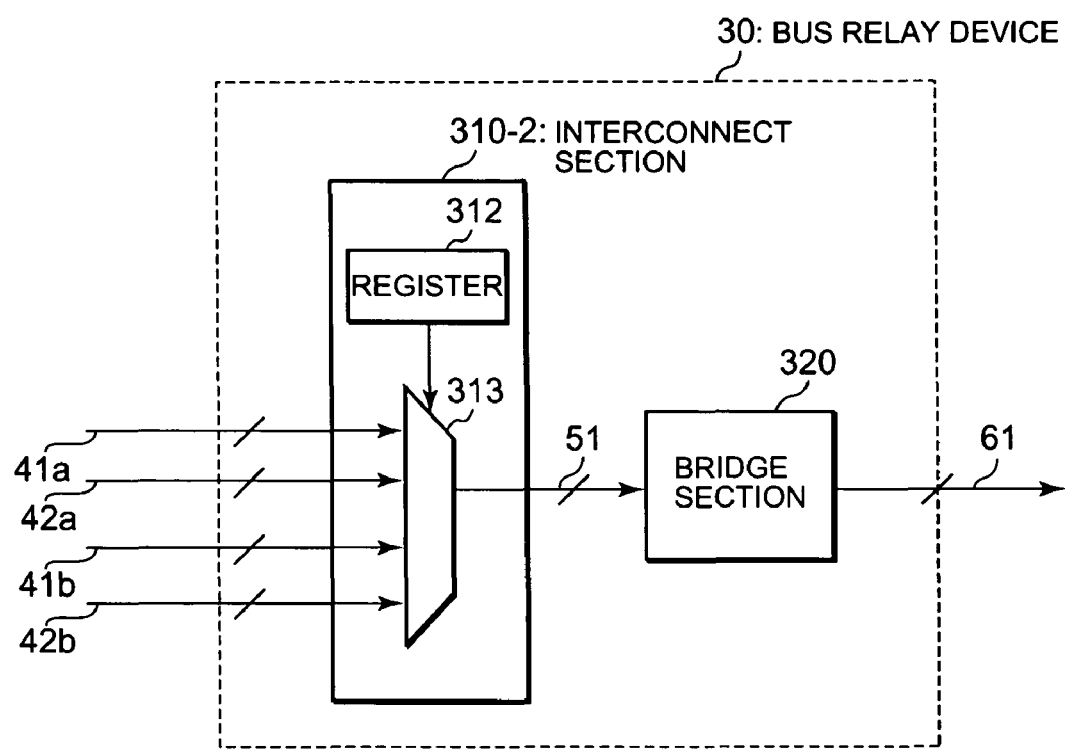
FIG. 3 is a block diagram showing a configuration example of a bus relay device according to a second embodiment.

FIG. 3 is a block diagram showing a configuration example of a bus relay device according to the second embodiment. The bus relay device 30 shown in FIG. 2 includes an interconnect section 310-2 and a bridge section 320. The interconnect section 310-2 includes a register 312 and an arbiter 313. The bus control system takes on the configuration shown in FIG. 1.

The register 312 stores the priority order information (priority order determination values) of the control signal groups. The priority order information to be stored in the register 312 is written in the register 312 beforehand and is rewritable by the central processing unit (CPU: Central Processing Unit). The arbiter 313 receives a plurality of first control signal groups outputted from the masters 10a and 10b. The arbiter 313 sequentially selects one first control signal group from the plurality of received first control signal groups according to the priority order information stored in the register 312. The arbiter 313 then converts the selected first control signal group into a second control signal group conforming to the relay bus specification, and outputs the second control signal group to the bridge section 320. Since the bridge section 320 is the same as that shown in FIGS. 1 and 2, the description is omitted.

In the forgoing way, according to this embodiment, a similar effect to that of the first embodiment can be obtained by the register 312 and the arbiter 313. Moreover, the priority order information stored in the register 312 can be rewritten by the CPU. Thus, the priority order can be changed according to the operation conditions of the bus control system 1, so that the priority order can be flexibly changed according to the access conditions from the masters 10a and 10b to the slave 20. In addition, since the priority order information stored in the register 312 can be changed according to the number of masters supported by the bus relay device, more flexible application of the bus control system can be implemented.

Other Embodiments

Note that, although the case where the masters output the read and the write control signal groups in each embodiment described above, the present invention is not limited to this case. The present invention is that, under a condition in which the first bus specification and the second bus specification are predetermined, (1) the interconnect section 310 receives a plurality of control signal groups and outputs a predetermined number of the received control signal groups corresponding to the number of control signal groups conforming to the second bus specification, and (2) the bridge section 320 performs the bus protocol conversion, according to the second bus specification, on the signals inputted from the interconnect section 310.

Accordingly, types of the control signal groups are not limited to the read and write types. In addition, the present invention is also applicable to an embodiment using a different number of control signal groups from the aforementioned embodiments, as in the case where the numbers of the control signal groups conforming to the first and second bus specifications are three and two, respectively.

Moreover, although the case of using two masters is taken as an example in each embodiment described above, this invention can be applied to a case where three masters or more are connected to the high speed bus. For example, in the case of the first embodiment, a circuit can be designed according to the predetermined priority order information while the number of control signal groups inputted to the arbiter 311 is adjusted to correspond to the number of masters. Furthermore, in the case of the second embodiment, this invention can be applied by increasing the number of control signal groups in the priority order information stored in the register 312.

Here, description is provided for the bus specification and the number of each kind of the first, second and third control signal groups of the bus relay devices shown in FIGS. 1 and 5. In FIG. 5, the second control signal groups correspond to the control signal groups 41x and 42x received by the bridge section 820. FIG. 4 is a table in which the numbers of control signal groups and the bus specifications are compared between the bus relay devices according to the present invention shown in FIG. 1 and the conventional bus relay device 80 shown in FIG. 5. FIG. 4 shows the numbers of first, second and third control signal groups and the bus specifications of the respective control signal groups of the bus relay device according to the present invention and the conventional one. Both bus relay devices 30 and 80 have four first control signal groups determined in conformity with the high speed bus specification. The bus relay device 30 has one second control signal group determined in conformity with the relay bus specification. Meanwhile, the bus relay device 80 has two second control signal groups determined in conformity with the high speed bus specification. Both bus relay devices 30 and 80 have one third control signal group determined in conformity with the low speed bus specification. Thus, the bus relay device 30 according to the present invention is different from the conventional bus relay device 80 in terms of the bus specification and the number of the second control signal groups outputted from the interconnect section 310 to the bridge section 320.

In FIG. 4, the number of the first control signal groups is four and depends on the number of the masters and the bus specification on the master side. Meanwhile, the numbers of the second and third control signal groups are one, and depend on the number of processable control signal groups which is determined in conformity with the bus specification on the slave side. The relay bus specification depends on the bus specification on the slave side because the number of the control signal groups of the relay bus specification is made equal to the number of the control signal groups of the bus specification on the slave side. Thus, in each embodiment described above, the numbers of control signal groups change as shown in FIG. 4. In addition, as the number of masters and the bus specifications change, the numbers of control signal groups also change as described above.

According to the preferred embodiments of the present invention, reducing the circuit size is made possible by using only one arbiter to implement, for example, the arbitration process of sequentially selecting and processing one of plural control signal groups, as described above, although such arbitration process has been conventionally implemented by three arbiters. Furthermore, the number of the control signal groups outputted from the interconnect section is reduced because the interconnect section alone collectively performs the arbitration processes separately operated in the interconnect section and the bridge section. Consequently, the number of the signal lines connecting the interconnect section and the bridge section can be reduced. Specifically, the one signal line shown in FIGS. 1 and 3 is actually composed of 100 signal lines or more. Accordingly, the reduction of the number of the signal lines is tremendous.

Moreover, according to the preferred embodiments of the present invention, an improvement in the efficiency of arbitrations and a simplification of the specification of the bus relay device can be achieved by collectively controlling the arbitrations through the arbitration process operated in the interconnect section alone. The design specification of the bridge section, particularly, can be simplified because the bridge section serves as the component for carrying out bus protocol conversion without performing the arbitration process. Thus, the number of man-hours for designing and inspecting the bridge section can be reduced.

Furthermore, according to the preferred embodiments of the present invention, when the bus specifications of the master side and the slave side are predetermined, the specification of the relay bus specification can be uniquely determined. Thus, the bus relay device according to the present invention can be applied to any desired bus control system by making the design related to the priority order information for the arbitration process in the interconnect section. This leads to reductions in the numbers of man-hours for design and inspection, and also an improvement of work efficiency. In addition, since, from a plurality of control signal groups, the interconnection section selects a predetermined number of control signal groups corresponding to the number based on the sub specification on the slave side, the master order and the control signal group order can be controlled collectively. This enables the implementation of a control of giving priority to the read and write control signal groups of a first master as well as to the read control signal group of a second master while lowering the priority order of the write control signal group of the second master. In other words, the arbitrations can be controlled by combining the master priority order and the control signal group order. For example, the conventional bridge section performs a control such that the read control signal group is preferentially processed first, and that then the write control signal group is processed after the completion of the process of the read control signal group. In this case, the control signal group order cannot be changed on a master-to-master basis. In contrast, the embodiments of this invention can achieve a more flexible and detailed control for the priority order.

It is apparent that the present invention is not limited to the above embodiments, but may be modified and changed without departing from the scope and spirit of the invention.

What is claimed is:

1. A bus apparatus, comprising:
   a first bus master coupled to a first bus to output a first signal group including at least one of signals onto the first bus;
   a second bus master coupled to the first bus to output a second signal group including at least one of signals onto the first bus;
   an interconnect section coupled between the first bus and a second bus to receive the first and second signal groups and to output a third signal group including at least one of signals onto the second bus; and
   a bridge section coupled between the second bus and a third bus to receive the third signal group and to output a fourth signal group including at least one of signals onto the third bus free from performing a selecting operation for the third signal group,
   wherein a bit width of the third signal group indicating an address is equal to a bit width of the first signal group indicating an address.

2. The bus apparatus according to claim 1, further comprising:
   a bus slave coupled to the third bus to receive the fourth signal group.

3. The bus apparatus according to claim 1, wherein the bit width of the third signal group is equal to a bit width of the second signal group indicating an address.

4. The bus apparatus according to claim 1, wherein the bit width of the third signal group indicating an address is wider than a bit width of the fourth signal group indicating an address.

5. A bus system, comprising:
 a first bus master coupled to a first bus to output a first signal group including at least one of signals onto the first bus;
 a second bus master coupled to the first bus to output a second signal group including at least one of signals onto the first bus;
 an interconnect section coupled between the first bus and a second bus to receive the first and second signal groups and to output a third signal group including at least one of signals onto the second bus; and
 a bridge section coupled between the second bus and a third bus to receive the third signal group and to output a fourth signal group including at least one of signals onto the third bus,
 wherein the third signal group includes a write enable signal.

6. The bus system according to claim 5, wherein the fourth signal group also includes a write enable signal.

7. The bus system according to claim 5, further comprising:
 a bus slave coupled to the third bus to receive the fourth signal group.

* * * * *